United States Patent Office 3,447,567
Patented June 3, 1969

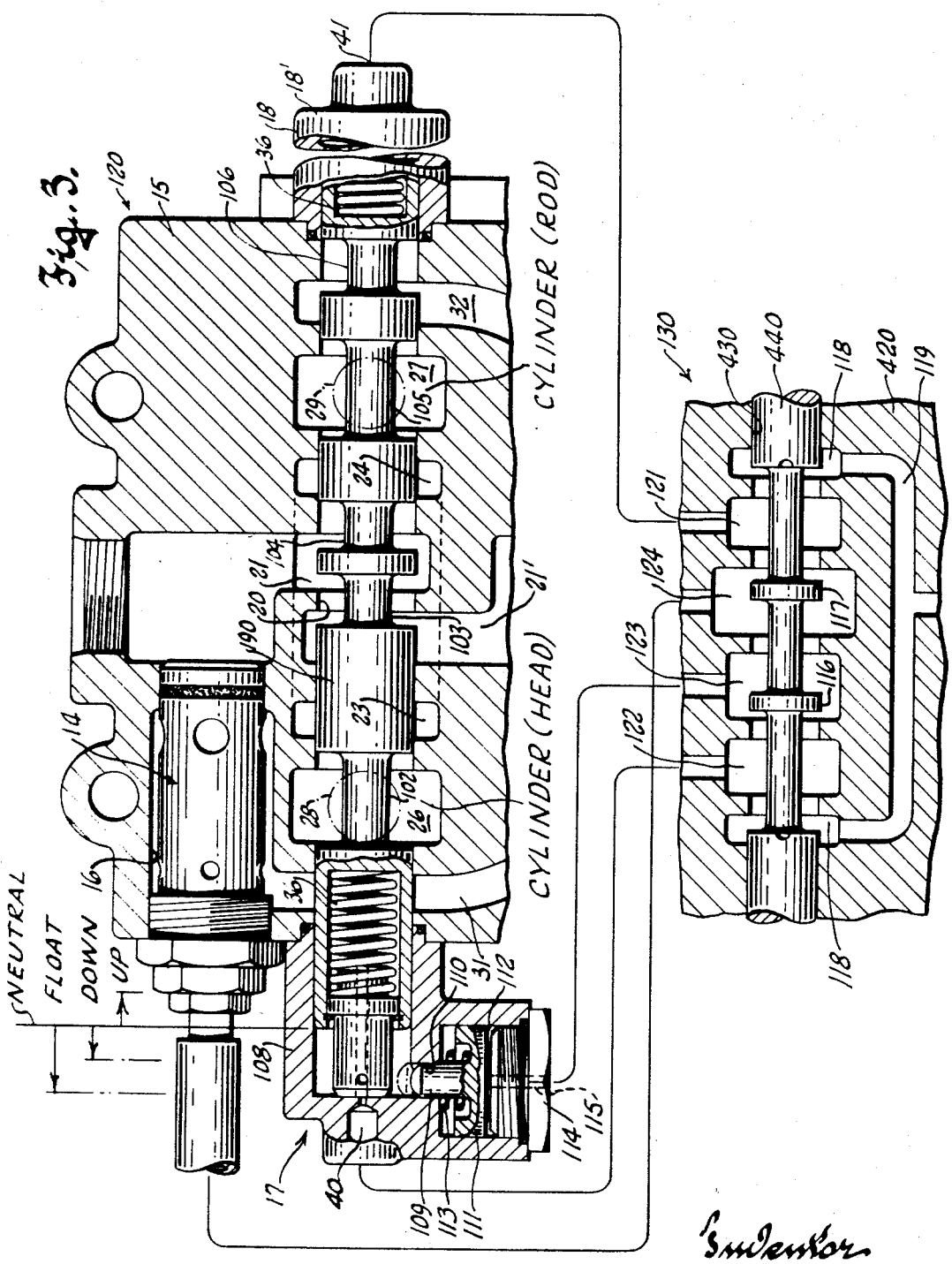

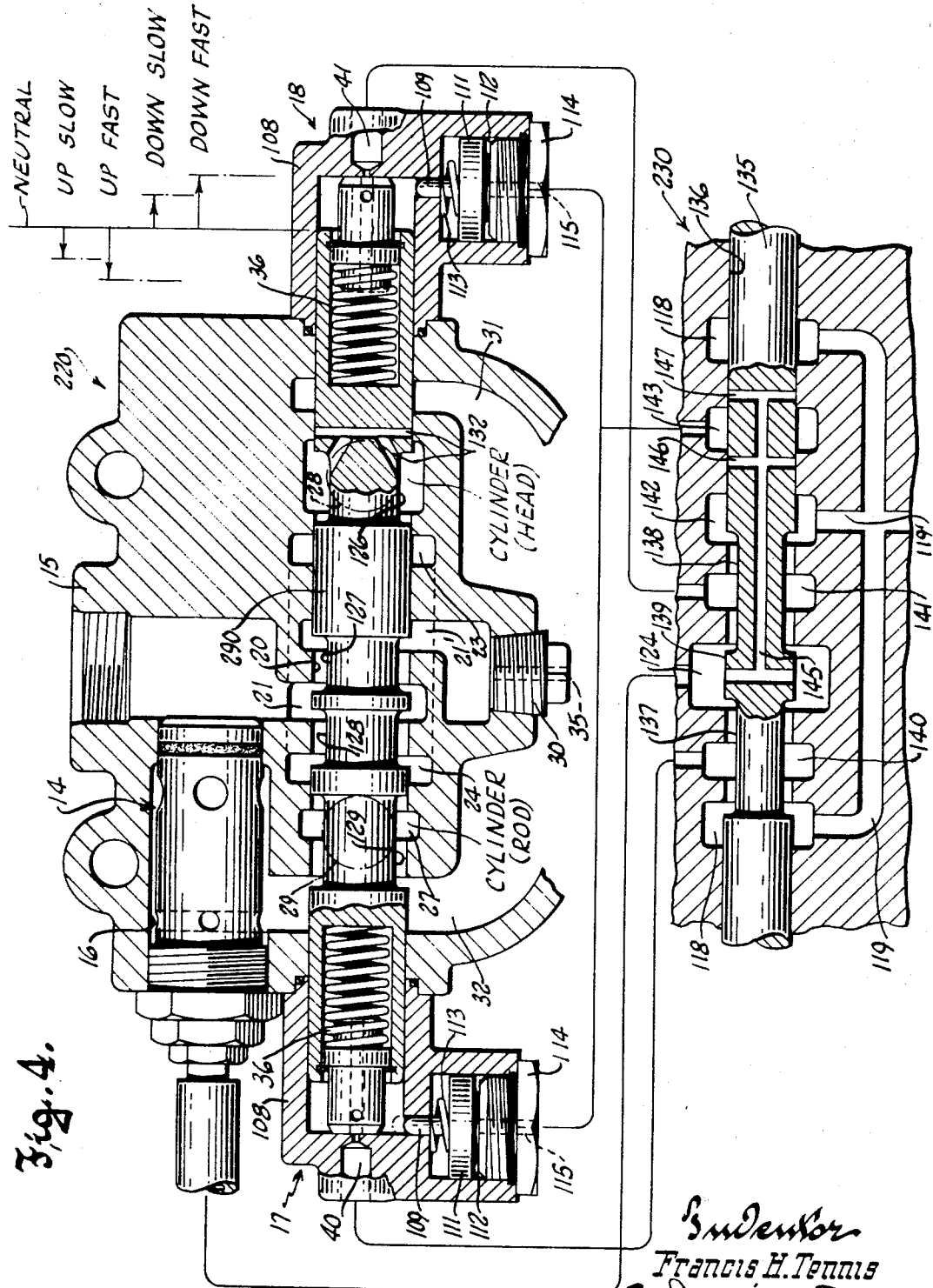

3,447,567
PILOT GOVERNED CONTROL VALVE
MECHANISM
Francis H. Tennis, Oconomowoc, Wis., assignor, by mesne assignments, to Koehring Company, Milwaukee, Wis., a corporation of Wisconsin
Continuation of application Ser. No. 468,526, June 30, 1965. This application Feb. 7, 1968, Ser. No. 707,367
Int. Cl. F16k *31/12, 31/36, 31/14*
U.S. Cl. 137—596.13                                  8 Claims

ABSTRACT OF THE DISCLOSURE

A manually actuatable pilot valve effects shifting of the spool of a main valve to and from its working positions. Control fluid flows to the inlet of the pilot valve from the inlet of the main valve through the interior of a bypass valve mechanism incorporated in the body of the main valve. The bypass valve mechanism responds to back pressure at the pilot inlet and adjustably controls fluid flow from the main valve inlet to its exhaust passage so as to regulate the speed of the motor governed by the main valve in any working position of its spool.

---

This application is a continuation of my copending application Ser. No. 468,526, filed June 30, 1965, now abandoned, and concerns an invention which relates to control valve mechanisms for fluid motors and the like. More particularly, this invention has reference to control valve mechanisms of the type wherein a pilot valve governs and cooperates with main and bypass valves to control both the speed and the direction in which a fluid motor is operated.

Pilot governed valve mechanisms of this general nature are disclosed in my Patent No. 3,151,455, issued Oct. 6, 1964. There, however, the main valve is not only separate from both the pilot and bypass valves, but it is of special construction comprising a pair of check-like valve members for each port of a fluid motor, along with pilot controllable hydraulic actuators for the valve members. As many as four hydraulic actuators are needed, one for each check valve member, for control of a reversible fluid motor or cylinder.

In general, it is the object of this invention to provide a pilot governed control valve mechanism like that of my aforesaid patent which, however, features a main valve having but one shiftable valve element to control the operation of a fluid motor connected therewith.

More specifically, it is an object of this invention to provide a pilot governed main control valve of the character described, wherein a pilot controllable bypass or metering valve mechanism can be built into the body of the main valve, as for example in the space therein ordinarily occupied by a conventional high pressure relief valve.

With these and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate several complete examples of the physical embodiment of the invention, constructed according to the best modes so far devised for the practical application of the principles thereof, and in which.

Figure 1:
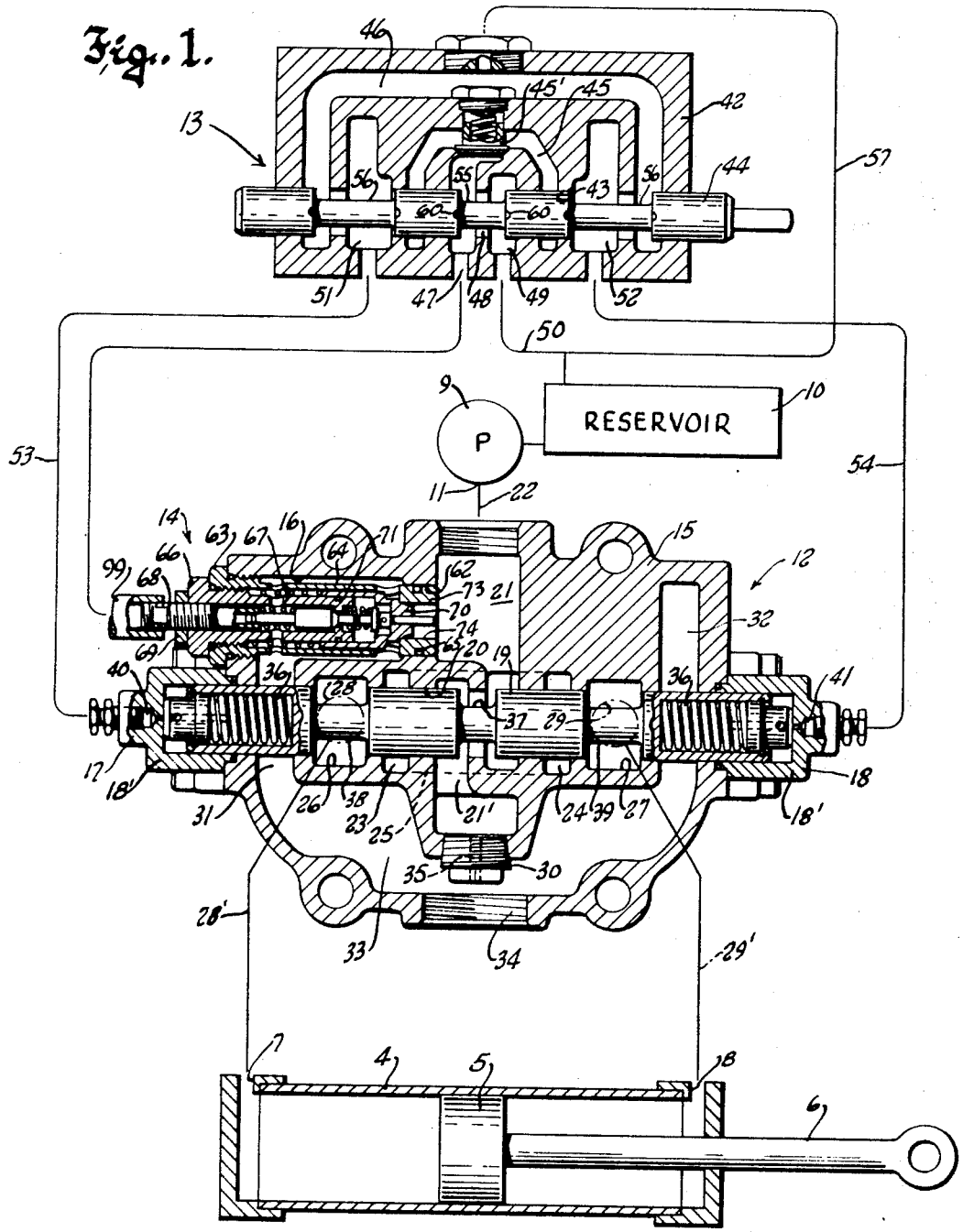
FIGURE 1 is a more or less diagrammatic view illustrating a pilot governed control valve mechanism of this invention embodied in a fluid pressure operated system comprising a double acting lift cylinder.
Figure 2:
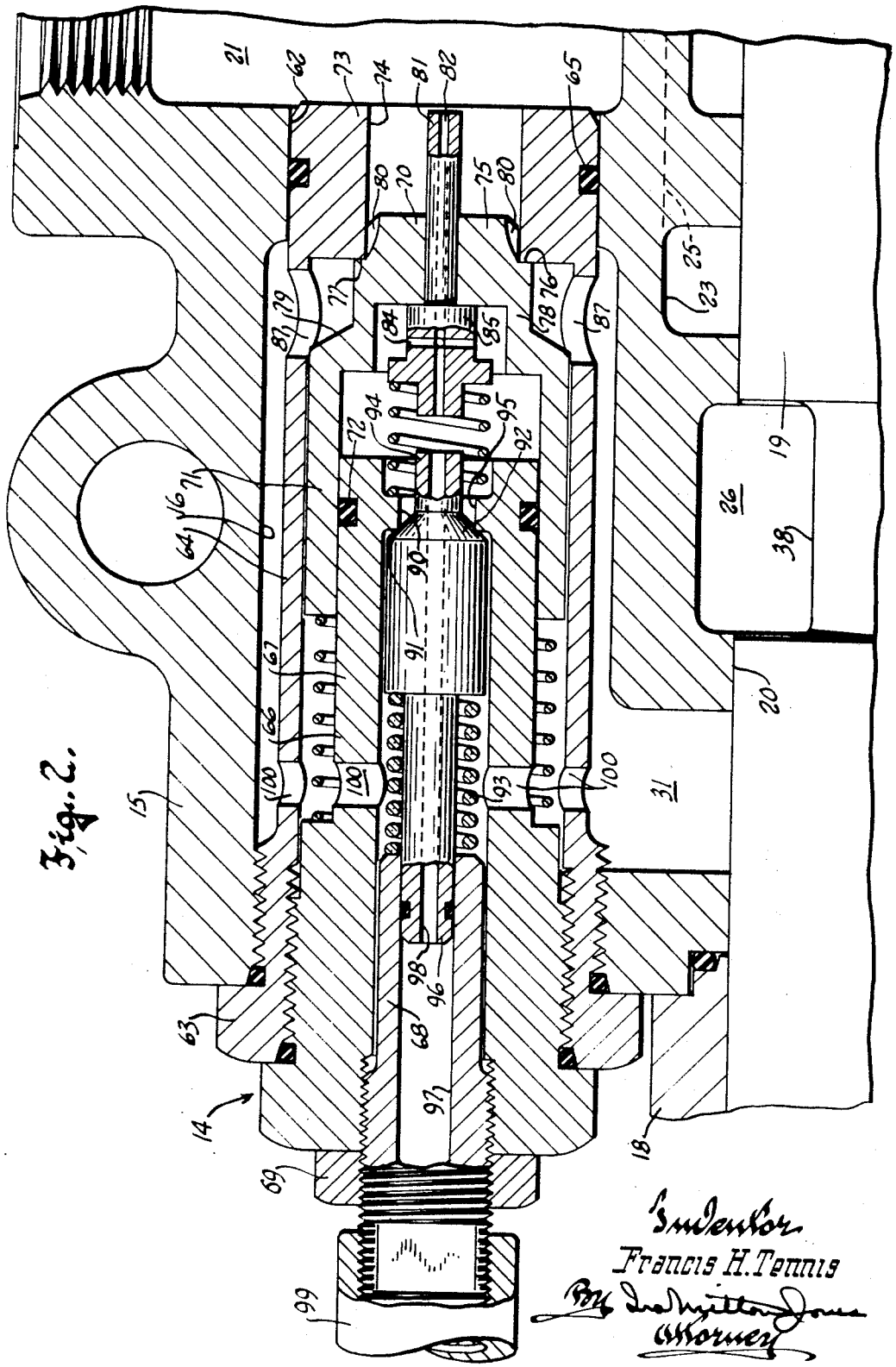
FIGURE 2 is an enlarged fragmentary sectional view showing the internal construction of the bypass and metering valve mechanism.

FIGURE 3 is a view similar to FIGURE 1, but illustrating a modified embodiment of the invention wherein the pilot valve is operable to effect shifting of the main valve element from a neutral position to three operating positions; and FIGURE 4 is a view similar to FIGURE 3, but illustrating a further modification of the invention embodying a pilot valve which is operable to effect shifting of the main valve element from a neutral position to four operating positions.

Referring now more particularly to the accompanying drawings, the numeral 4 designates a double acting hydraulic lift cylinder having a piston 5 which can be driven upwardly in the cylinder to extend its piston rod 6 and lift a load connected thereto when pressure fluid is supplied to a port 7 in the lower or head end of the cylinder and fluid is free to exhaust from a port 8 in the rod end of the cylinder. The load can be lowered when the supply and return flow is reversed.

A motor driven pump 9, having its inlet connected with a fluid reservoir 10, provides a source of fluid under pressure that can flow from the outlet 11 of the pump to either cylinder port 7 or 8 via a main valve mechanism 12 under the control of a pilot valve mechanism 13. The pilot valve mechanism also governs a combination bypass, relief, and speed controlling valve mechanism 14, which can be made compact enough to enable it to be incorporated in the body 15 of the main valve mechanism 12.

The main valve mechanism 12 is generally on the order of that disclosed in my Patent No. 2,873,762, issued Feb. 17, 1959. It differs therefrom primarily in that the combination bypass and speed controlling valve mechanism 14 is incorporated in the bore 16 ordinarily provided to receive part of a conventional high pressure relief valve mechanism, and in that hydraulic actuators 17 and 18 are mounted on the body and connected to the opposite ends of the control spool 19 to effect shifting thereof to each of a pair of operating positions at the dictate of the pilot valve 13. The valve spool is slidable axially back and forth in a bore 20 in the valve body, beneath and parallel to the bore 16. An inlet passage 21 in the body medially intersects the bore 20, and opens upwardly to the exterior of the body to provide an inlet port which is connected with the outlet of the pump by a supply line 22.

At axially opposite sides of the inlet passage the bore is intersected by the opposite legs or branches 23–24 of a U-shaped bridge passage like that designated 45 in the pilot valve 13. The bight portion 25 of this passage extends lengthwise of the bore 20 a distance to one side thereof, and it communicates with the inlet passage through a check valve such as that indicated at 45′ in the pilot valve, which opens in the direction to let fluid flow into the bridge passage from the inlet passage. At locations axially outwardly of the branches 23–24 of the bridge passage, the bore is enlarged to provide pressure wells 26–27 located at the inner ends of service passages 28–29, respectively. Ducts 28′ and 29′ connect the service passages 28 and 29 with the motor ports 7 and 8, respectively.

Axially outwardly of the pressure wells 26–27, the bore 20 is intersected by the upright branches 31–32 of a U-shaped exhaust passage the bight portion 33 of which provides a common return passage located beneath the bore. The return passage opens to the bottom of the body through an outlet or return port 34 which is in line with the inlet passage 21 and is connected with the reservoir by a return line, not shown.

In a conventional open center type control valve such as disclosed in my aforesaid patent, the inlet passage 21 has a downstream branch 21' with which it communicates laterally through the bore 20. This downstream branch 21' extends downwardly from the bore 20 and opens into the return passage 33 through a threaded hole. For the purposes of this invention, however, this hole can be closed by a plug 30, to in effect convert the main valve to the closed center type; but if desired, the plug can have a small diameter passage 35 therethrough.

The control spool or valve element 19 is normally held in a neutral or hold position by centering springs 36 acting upon its opposite ends, and at which position a central circumferential groove 37 in the spool registers with the inlet passage 21, while other circumferential grooves 38 and 39 in the spool register with the pressure wells 26 and 27, respectively, of the service passages. In other words, the service passages are closed off from their adjacent branches of both the exhaust passage and the inlet connected bridge passage, and the piston 5 in the cylinder 4 can move neither up nor down. As will be discussed at greater length hereinafter, the pump is unloaded through the bypass valve mechanism 14 when the main valve is in its neutral position.

The spool or valve element 19, when shifted to the right to a first operating or load lifting position, establishes a supply flow path from its inlet passage 21 to the service passage 28 through the left hand leg 23 of its bridge passage, the groove 38 in the spool, and the pressure well 26 in the body, so that source fluid can flow to the head end of the cylinder 4, provided the bypass valve mechanism is closed at this time. The spool also establishes an exhaust flow path from the service passage 29 to the exhaust branch 32 through the pressure well 27 and the groove 39 at this time. Hence, source fluid can flow into the cylinder to raise its piston 5, and the fluid above the piston is delivered to the reservoir through the return passage 33.

These connections between the service passages and the cylinder ports are reversed when the spool is shifted to the left from its hold position shown, to a second operating or load lowering position, to effect downward travel of the piston in its cylinder in consequence of the admittance of pressure fluid into the upper end of the cylinder while fluid exhausts from its lower port 7. In this second operating position, of course, the bypass valve mechanism 14 must be closed in order to effect pressurization of the bridge passage 25 and flow of pressure fluid through its right hand leg 24 to service passage 29. The other service passage 28 is connected to the left hand branch 31 of the exhaust passage in this position of the control spool.

The opposite end portions of the valve element or control spool 19 project from the valve body to form part of the hydraulic actuators 17 and 18. Each of these actuators comprises a cylinder defining cup 18' secured to the exterior of the body, and a piston therein provided by the adjacent projecting end of the spool. The pistons are hollow and have the centering springs received in their interiors. Pressurized control fluid can be supplied to the left hand actuator 17 through a port 40 in its cylinder to effect shifting of the control spool 19 to its load lifting position, provided, of course, that fluid can be exhausted through a port 41 in the cylinder of the other actuator 18. If control fluid is supplied to the port 41 while fluid in the left hand actuator can be exhausted through its port 40, the control spool will be shifted out of neutral to its second operating or load lowering position described earlier. From this it will be seen that the two cylinders 18' provide hydraulic actuating means that are the equivalent of a double acting hydraulic cylinder that could be connected to the control spool to shift it back and forth in its bore. It will also be apparent that the centering springs 36 can operate to return the control spool to its neutral position only when both actuator ports 40 and 41 are in communication with the reservoir.

The pilot valve mechanism 13 governs the flow of pressurized control fluid to the ports 40 and 41 of the spool actuators as well as flow of exhaust fluid therefrom to the reservoir 10. It is similar to the main valve both in construction and operation, but is very small in comparison. Thus, its body 42 has a bore 43 in which a small diameter spool or valve member 44 is shiftable endwise in opposite directions from a neutral position shown, to load lifting and load lowering positions corresponding to those of the control spool of the main valve. For convenience of illustration, however, both its U-shaped high pressure bridge passage 45 and its U-shaped exhaust passage 46 have been shown more or less diagrammatically and in the same plane.

The pilot valve, which is of the open center type, has an inlet 47 connecting with an upstream branch of its open center passage 48, and an outlet 49 connecting with a downstream branch of the open center passage. These branches of the open center passage are normally communicated with one another by the bore 43 through a central circumferential groove 55 in the valve member 44, so that pressure fluid from a source thereof can pass freely into the inlet 47 and flow through the open center passage 48 to the outlet 49 for return to the reservoir via a duct 50.

The body 42 of the pilot valve also has a pair of control ports that open from service passages 51 and 52, which intersect the bore 43 at zones between the adjacent legs of the U-shaped bridge passages 45 and 46. The service passages 51 and 52 are connected to the ports 40 and 41 of the hydraulic actuators 17 and 18 for the main valve by control ducts 53 and 54, respectively.

Like the spool of the main valve, the pilot valve element or spool 44 also has end grooves 56, but these are axially long enough to communicate both service passages with their adjacent exhaust branches through the bore 43 in the neutral position of the valve element, at which the service passages are closed off from the high pressure bridge passage 45. Since the exhaust passage 46 is connected with the reservoir through a line 57, the pilot ports of both spool actuators are thus in communication with the reservoir in the neutral position of the pilot valve element, and the centering springs 36 hold the main valve spool in its neutral position.

Shifting of the pilot valve member to the right to a load lifting position from its neutral position shown, diverts pressure fluid from the inlet 47 to the high pressure bridge passage 45 and thence to the service passage 51 for flow to the pilot port 40 of the left hand actuator 17 for the spool of the main valve. In this load lifting position of the pilot valve member, the service passage 52, and hence the pilot port 41 of the right hand spool actuator 18, are communicated with the exhaust passage 46. Consequently, the main valve spool will be shifted to the right, to its load lifting position described earlier.

Similarly, if the valve member of the pilot valve is shifted to the left, from neutral, to its load lowering position, it reverses the connections between its control ports and the pilot valve passages to effect shifting of the main valve spool to the left, by its right hand actuator 18, to cause lowering of the piston 5 in its cylinder 4.

The valve member 44 of the pilot valve preferably is provided with metering notches 60 in the ends of the lands defining its central groove 55. These notches enable the spool to accurately variably restrict communication between its inlet 47 and outlet 49 through the open center passage 48 in any of a number of positions of the valve member intermediate its two operating positions described, and accordingly vary the back pressure of source fluid at its inlet.

The bypass valve mechanism 14 functions in response to the pressure at the inlet 47 of the pilot valve. It is adapted to open when this pressure is at a minimum value such as obtains when the pilot valve member is in its neutral position, to bypass the source fluid entering the inlet passage 21 of the main valve to the exhaust branch 31 thereof. The bypass valve mechanism 14 is adapted to close whenever maximum pressure obtains at the inlet 47 of the pilot valve, as in either operating position of its valve member 44, to cause all of the source fluid entering the main valve to be diverted to one or the other of the motor ports, 7 or 8.

Further, the bypass valve mechanism 14 is adapted to divert or bypass source fluid from the inlet passage 21 of the main valve to its return passage 33 in an amount substantially proportional to the amount of source fluid which the pilot valve element allows to flow to its outlet 49 from its inlet 47. In this way, the pilot valve effectively controls the speed at which the piston travels either upwardly or downwardly in its cylinder 4.

The bypass valve mechanism 14 is shown as a self contained unit, or cartridge, which is received within the bore 16 above the bore 20 containing the control spool 19. At its inner or forward end, the bore 16 opens to the inlet passage 21 of the main valve through a reduced bore portion 62. The rear portion of the bore 16 intersects the exhaust branch 31 and opens to the exterior of the valve body 15, where it is threaded to receive the enlarged and externally threaded head 63 of an outer tubular body 64 in which the bypass valve mechanism is mounted. The tubular body 64 is substantially smaller in diameter than the bore 16, and it extends forwardly into the bore 62, in which it is sealed as by means of an O-ring 65 confined in a circumferential groove in the exterior of the body.

Threaded into the rear of the head 63 is an inner tubular member 66 having a reduced and hollow cylindrical shell 67 disposed concentrically within the body 64 of the outer member, so as to be radially spaced from the bore of the latter. The forward end of this shell terminates a distance from the front of the outer body. A screw 68 having an axial bore therethrough is threaded into the rear of the inner tubular member 66, and is held in any desired axial position relative thereto by means of a lock nut 69 threaded onto its projecting end and bearing against the outer end of the tubular member 66.

The bypass valve mechanism comprises a cup-like main valve member 70 having its cylindrical skirt 71 slidably telescoped over and supported upon the front portion of the cylindrical shell 67, but sealed with respect thereto by means of an O-ring 72 confined in a groove in the exterior of the shell. The forward end of the main valve member faces an internal collar 73 on the inner end of the outer tubular member 64, and the collar has an axial bore 74 therethrough slightly smaller in diameter than the external diameter of the shell 67.

A reduced nose 75 on the front of the bypass valve member 70 slidably fits the bore 74 and projects axially forwardly from a shoulder 76 on the valve member. This shoulder is adapted to engage the valve seat 77 provided by the rear face of the collar 73 in the closed position of the valve member to prevent source fluid in the inlet passage 21 of the main valve from flowing through the bore 74 in bypass relation to the service passages of the main valve. The shoulder 76 is defined by the forward end of a stepped intermediate portion 78 on the valve member, having a diameter smaller than the internal diameter of the skirt 71, and which defines a larger forwardly facing shoulder 79 at its junction with the skirt. Metering slits 80 are preferably formed in the exterior of the nose 75 for a purpose to be shortly described.

The bypass valve member 70 also has a bore through its nose to axially slidably mount a plunger 81 having a small diameter passage 82 therethrough. The passage 82 is intersected by a cross hole 84 in an enlarged head portion 85 of the plunger inside the bypass valve member.

From the description thus far, it will be seen that source fluid under pressure in the inlet passage 21 of the main valve and in the bore 74 can exert force on the front end of the bypass valve member tending to unseat the valve. Such fluid can also flow into the hollow interior of the bypass valve member where it can act upon much larger rearwardly facing surfaces of the valve member to hold it seated against the opening force which inlet fluid exerts upon its nose, as long as the interior of the bypass valve member is not vented. When the space inside the bypass valve member is vented, source fluid in the inlet passage 21 of the main valve forces the bypass valve member to a bypass open position allowing source fluid to flow through the bore 74 and out through one or more radial outlets 87 in the outer tubular member adjacent to the seat 77, to the bore 16 and thence to the reservoir via the exhaust passage branch 31. This effectively unloads the pump.

It is noteworthy that the bypass valve member also serves as a void control valve, in that it can open in response to the force which reservoir fluid exerts on its shoulder 79 at times when fluid pressure in the inlet passage 21 and either service passage then connected therewith drops to a value below that of fluid obtaining in the exhaust branch 31 and bore 16, to allow such reservoir fluid to flow to the inlet passage and augment pump flow to a service passage then connected therewith.

The shell 67 of the inner tubular member 66 also has an internal collar 90 therein near its forward end. This collar defines a rearwardly facing seat 91 that is normally engaged by a pilot poppet 92 under the force of a compression spring 93 confined between it and the adjustable screw 68. A reduced nose 94 on the pilot poppet projects forwardly through the bore 95 in the collar 90 toward the head 85 on the plunger 81, and a stem 96 on the poppet is slidably received in the bore 97 extending through the spring tensioning screw 68 to guide the poppet for movement toward and from engagement with its seat 91. In addition, a small diameter axial passage 98 extends entirely through the poppet 92, its nose 94 and stem 96, to cooperate with the passage 82 and bore 97 in providing a pilot supply passage through which source fluid can flow to the inlet 47 of the pilot valve from the inlet passage 21 of the main valve. A duct 99 connects the bore or passage 97 in the adjusting screw with the pilot inlet for that purpose.

From this it will be seen that the pilot valve element controls the pressure in the interior of the bypass valve member 70. It causes the bypass valve member to close in response to back pressure in the pilot supply line provided by the central passages through the components of the bypass valve mechanism, at times when the pilot valve member is in either operating position thereof. When the pilot valve member is in its neutral position it vents the interior of the bypass valve member to cause it to open in response to the pressure of fluid in the inlet passage of the main valve. When the pilot valve member is in any of a number of positions intermediate neutral and either operating position, it allows partial opening of the bypass valve and bypass flow of part of the source fluid in the inlet passage 21 of the main valve to the reservoir, while the remainder flows to the service passage then communicated with the inlet passage 21. In other words, the bypass valve then effects metering of the flow of source fluid to the cylinder 4, to regulate the speed of travel of its piston 5 in accordance with the metering position of the valve member of the pilot valve.

The bypass valve member 70 also serves as a high pressure relief valve which is caused to open whenever the pilot poppet 92 is unseated in consequence of the opening force exerted thereon by fluid at a predetermined high relief valve in the interior of the bypass valve member. When the pilot poppet opens under such conditions, it effects venting of the space inside the bypass valve member, allowing fluid therein to flow through the pilot poppet seat to the space in the shell 67 outwardly thereof, from whence it can flow to the exhaust branch 31 via radial holes 100 in the shell 67 and the outer tubular body 64. The bypass valve member then opens under the force which fluid in the inlet passage 21 exerts on its nose, to allow inlet fluid to flow to the bore 16 and exhaust passage branch 31 in the manner described above, to relieve the excessively high pressure. At such times, the plunger 81 is moved rearwardly by the inlet fluid, into engagement with the nose 94 on the pilot poppet to help hold it open.

It will thus be seen that the bypass valve mechanism functions in a variety of ways, as for example, to unload the pump, to control the speed of operation of the fluid motor, to relieve voids, and to relieve excessively high pressures. All of these ends are achieved while retaining compactness of the mechanism to a degree such that it can be mounted in a part of the space normally occupied by a conventional single purpose high pressure relief valve in the body of the main control valve. In addition, the bypass valve mechanism is constructed such as to enable the pilot valve mechanism to be supplied with control fluid under pressure thereby, from the inlet passage of the main valve, so as to obviate the need for a special pilot pump.

It will be appreciated that the bypass valve mechanism 14 is useful primarily with main valves of the closed center types, wherein it is always free to open and unload the pump whenever the pilot valve member is in its neutral position, in much the same way as an open center passage in the main valve does.

If the bypass valve mechanism is large enough to accommodate the full output of the pump in the neutral position of the main valve spool 19, there is no need for the passage 35 in the plug 30 closing the downstream branch 21' of the inlet passage in the main valve. In fact, the valve spool would then not even need the central circumferential groove 37 therein and the inlet passage 21 could be completely closed by the spool in its neutral position.

The central groove 37 in the main valve spool, and the passage 35 in the plug 30, however, allow the bypass valve mechanism to be made very small and compact. They normally allow part of the pump fluid entering the inlet passage 21 to flow past the spool to the return passage 33, while the remainder flows to the return passage through the bypass valve mechanism, without in anywise interfering with the desired operation of the bypass valve mechanism. This is possible, of course, as long as the passage 35 in the plug restricts communication between the inlet and return passages to a degree sufficient to assure that fluid in the inlet passage will be at a high enough value, when the bypass valve is closed, to assure actuation of the main valve spool by its hydraulic operators 17 and 18.

The pressure needed for shifting the main valve spool hydraulically will vary with the diameter of the spool and the size of the main valve, but it will seldom exceed a value which is a small fraction of the normally high operating pressures in the system. For example, a pressure of about 30 to 50 p.s.i. will suffice for actuation of the main valve spool of an average size valve.

In any event, the main valve spool blocks communication between its inlet and the passage 35 in the plug 30 in either operating position of the spool, to thus make full pump pressure available for actuation of the cylinder 4.

FIGURE 3 illustrates a modification of the invention wherein the main valve 120 has a valve element or spool 190 that can be hydraulically shifted to the left of neutral beyond its load lowering position to a float position at which both service passages 28 and 29 are connected with the return passage 33 through their respective exhaust branches 31–32. The main valve has passages arranged substantially as heretofore described, but its valve element or spool 190 has five axially spaced circumferential grooves 102, 103, 104, 105, 106 therein, reading from left to right. As before, the lands defined by these grooves close off the service passages 28 and 29 from their adjacent branches of both the exhaust passage and the inlet connected bridge passage in the neutral position of the spool shown. The narrow land defined by the grooves 103–104 is then centrally disposed in the inlet passage 21 so that fluid can flow to the downstream branch 21' thereof.

Those familiar with control valves of the type herein shown will appreciate that the spool 190, when shifted to a raise position to the right of neutral, communicates the head connected service passage 28 with the inlet passage 21 through the leg 23 of the bridge passage, and communicates the rod connected service passage 29 with the adjacent exhaust branch 32 to cause the load connecting with the piston rod 6 of the cylinder 4 to be raised. The load is lowered when the spool is shifted a first distance to the left of neutral to reverse these connections to the service passages 28–29.

The spool is also shiftable to the left of its load lowering position to a float position to communicate the service passages 28–29 with one another through the return passage 33. In the float position, the narrow medial land of the spool is located centrally of the downstream branch 21' so as to communicate the inlet passage 21 therewith, while the service passages 28–29 are in communication with their adjacent exhaust branches 31–32, respectively, but are closed off from the legs 23–24 of the bridge passage.

The hydraulic actuator 18 for the control spool 190 is the same as that described previously. The actuator 17, however, is different in that the axial dimension of its cylinder 108 is increased to accommodate a plunger 109, which is projectable into the cylinder from one side thereof to provide a stop with which the adjacent end of the valve spool is engageable to define the load lowering position of the spool. When the plunger 109 is retracted, the control spool 190 can be hydraulically actuated to its float position defined by the engagement of the end of the valve spool with the outer end of the cylinder 108.

The plunger 109 is slidably mounted in a radial bore 110 in the side wall of the cylinder 108, and it has a head 111 which is slidably received in a counterbore 112 into which the bore 110 opens. A coil spring 113 confined between the bottom of the counterbore and the head 111 yieldingly urges the plunger to a normally inoperative position retracted from the cylinder 108 and defined by the engagement of the head with a plug 114 threaded into the mouth of the counterbore to close the same. An axial passage 115 through the plug enables fluid under pressure to be introduced into the counterbore beneath the head of the plunger 109 to project the plunger to its operative position indicated by construction lines in FIGURE 3.

The pilot valve 130 for controlling actuation of the spool of the main valve by its hydraulic operators 17 and 18 is only fragmentarily and diagrammatically shown in FIGURE 3. Its valve element 440 slides axially in a bore 430 in the body 420 of the pilot valve from a neutral position shown to each of three operating positions to effect movement of the valve element of the main valve to either its raise, lower, or float positions described above. Hence, when the pilot spool is shifted to a first operating position to the right of neutral, it is adapted to effect actuation of the main valve spool to the right from its neutral position to a raise position defined by the engagement of the end of the main valve spool with the end wall of its actuating cylinder 18'.

The pilot valve spool is shiftable to the left of neutral to second and third operating positions to respectively effect actuation of the main valve spool to its lower and float positions by its operator 18.

The bore 430 of the pilot valve is enlarged to provide six axially adjacent chambers, and the pilot spool is formed with three axially adjacent circumferential grooves that cooperate to define two substantially narrow and widely spaced lands 116, 117. The two endmost chambers 118 are joined by an exhaust passage 119; the two chambers 122, 121 that are inwardly adjacent to the exhaust chambers 118 are at the inner ends of service passages that are respectively connected with the ports 40, 41 of the hydraulic actuators 17, 18. The inlet chamber 124 is located inwardly adjacent to the chamber 121, and the sixth chamber 123 is located between the inlet chamber 124 and the chamber 122.

As before, pressure fluid is supplied to the inlet chamber 124 from the pilot supply passage in the combination bypass and speed controlling valve mechanism 14. The remaining chamber 123 is communicated with the passage 115 in the plug 114, to enable the pressure chamber 112 to be connected either with the exhaust passage 119 in the pilot valve or with the inlet chamber 124 of the latter.

In the neutral position of the pilot spool 440 shown, all of its chambers are in communication so as to vent the cylinders of both hydraulic actuators 17–18 and to vent the pressure chamber 112 of the actuator 17. When the pilot spool is shifted to the right of neutral to its raise position, its land 117 closes off the inlet chamber 124 from the chamber 121 but leaves the latter in communication with the exhaust chamber 118 so as to vent the cylinder of the actuator 18. At the same time the lands on the pilot spool close off the chamber 122 from its adjacent exhaust chamber 118 but leave it in communication with the inlet chamber so that pressure fluid flows into the cylinder of the actuator 17 through its port 40 to cause actuation of the main valve spool to the right, to its raise position. It is merely incidental that the plunger 109 will be projected to its operative position at this time due to the fact that the pilot spool diverts fluid from the inlet chamber 124 to both chambers 122–123 to its left.

To effect actuation of the main valve spool to the left to its second operating or load lowering position, the pilot spool is shifted a first distance to the left of neutral to a position at which the land 116 thereon blocks communication between the chambers 122 and 123, leaving the former in communication with its adjacent exhaust chamber 118 and the latter in communication with the inlet chamber 124. In this position of the pilot spool, pressure fluid is diverted into both chambers 123 and 121 although the latter is closed off from its adjacent exhaust chamber 118 by the endmost land on the right hand end of the spool. As a result, pressure fluid flows to the pressure chamber 112 from chamber 123 to effect projection of the plunger 109 to its operative position defining a stop for the main valve spool, and pressure fluid also flows into the cylinder of the actuator 18 to propel the main valve spool to its load lowering position defined by the plunger 109.

The main valve spool will be actuated to its float position by the actuator 18 when the pilot spool is shifted to its third operating position, beyond its last discussed position, at which its lands block communication between the inlet chamber 124 and the chamber 123, while its grooves communicate the chamber 121 with the inlet chamber but communicate both chambers 122 and 123 with the left hand exhaust chamber 118. In this position of the pilot spool, the cylinder of the actuator 17 and the pressure chamber 112 thereof are vented and the plunger 109 is accordingly retracted so that there is nothing to obstruct movement of the main valve spool to its float position in consequence of the flow of pressure fluid into its cylinder 18' from the inlet chamber 124 and chamber 121 of the pilot valve.

Obviously, the main valve spool will be returned to its neutral position by the action of the centering springs thereon whenever the pilot spool is returned to its neutral position.

The pilot governed valve mechanism shown in FIGURE 4 illustrates how a suitable pilot valve 230 can effect shifting of the valve element 290 of a main valve 220 from a neutral position of the latter as shown, to each of four different operation positions. The main valve is also of the type intended to govern a double acting lift cylinder (not shown), but its valve element 290 is cooperable with passages in the body of the main valve to effect either slow or fast raise of the load on the cylinder, or to effect either slow or faster descent of the load on the cylinder. Thus, the main valve is similar in many respects to that disclosed in my copending application Ser. No. 230,524, filed Oct. 15, 1962, now Patent No. 3,263,574, issued Aug. 2, 1966.

As before, there are two hydraulic actuators 17 and 18 for the main valve spool. Both of these, however, have cylinders 108 with pressure responsive plungers 109 slidable radially toward and from projected positions at which they define two of the operating positions of the main valve element 290. The ends of the cylinders 108 are engageable by the valve element when the plungers 109 are retracted, to define the other two operating positions of the main valve element.

The centering springs in the hollow opposite end portions of the main valve element normally hold the latter in its neutral position shown, at which its four axially spaced grooves 126, 127, 128 and 129 are disposed to communicate the inlet passage 21 with its downstream branch 21' and to communicate the rod connected service passage 29 with its adjacent exhaust branch 32. The lands between the grooves, however, close off both service passages from their adjacent legs 23–24 of the inlet connected bridge passage, and block communication between the head connected service passage 28 and its exhaust branch 31. Hence, fluid is trapped in the head end of the cylinder to prevent descent of the load carried thereby.

The load on the cylinder will be lifted at one rate whenever the main valve spool is shifted a first distance to the left of neutral to a position defined by the projected plunger 109 of actuator 17. In this slow raise position of the spool, the land between grooves 127 and 128 closes off the inlet passage 21 from its downstream branch 21', and inlet fluid can flow through leg 23 of the bridge passage and groove 126 to the head connected service passage 28. The rod connected service passage is communicated only with its exhaust branch 32 through groove 129.

The load on the cylinder will be raised at a faster rate whenever the main valve spool is shifted a second distance to the left of neutral, to a position engaging the end of the cylinder of actuator 17. In this fast raise position, the lands on the spool close off both service passages 28–29 from their respective exhaust branches, and grooves 126 and 128 communicate the service passages with one another through the legs 23–24 of the inlet connected bridge passage so that pump fluid from inlet passage 21 together with exhaust fluid from the rod connected service passage flow to the head connected service passage for delivery to the cylinder.

The load on the cylinder will be lowered at a slow rate whenever the main valve spool is shifted a first distance to the right of neutral to a position engaging the projected plunger 109 of actuator 18, and at which position communication between the inlet passage 21 and its downstream branch is disrupted, and inlet fluid can flow through bridge leg 24 and groove 129 to the rod connected service passage, and return fluid from the head end of the cylinder flows to the exhaust branch 31 through groove 126 and a restricted branched passage 132 in the spool. Hence, the load descends at a slow rate determined by the degree the branched passage 132 restricts exhaust flow from the head end of the cylinder.

The load on the cylinder will descend at a faster rate, in consequence of flow of inlet fluid to the rod connected service whenever the main valve spool is shifted a second distance to the right of neutral, to a position at which the restricted passage 132 is no longer effective, and all return fluid from the head end of the cylinder flows to the exhaust branch 31 through the groove 126 in the spool.

The spool 135 of the pilot valve 230 is adapted to control pressurization of the cylinders of actuators 17 and 18 as well as the chamber 112 of each. Like the main valve spool, the pilot spool also has a neutral position shown, and it is movable to each of two operating positions at opposite side of neutral and corresponding to the four operating positions of the main spool.

The spool of the pilot valve, which is again shown in diagrammatic form, slides in a bore 136 and is formed with two axially spaced grooves 137 and 138 that cooperate to define a central land 139 substantially midway between the end lands on the spool. The bore is enlarged to provide seven axially adjacent chambers, the end chambers 118 being joined by an exhaust passage 119 as in the pilot valve of FIGURE 3.

The chamber 140 adjacent to the left hand exhaust chamber 118 connects with a service passage that is communicated with the cylinder port 40 of the hydraulic actuator 17. The inlet chamber 124 is next adjacent to the chamber 140 and it is supplied with pressure fluid from the pilot supply passage in the combination bypass and speed controlling valve mechanism 14 in the main valve. The chamber 141 to the right of the inlet chamber connects with a service passage that is communicated with the cylinder port 41 of the other hydraulic actuator 18, and is immediately to the left of a chamber 142 that is communicated with the exhaust passage 119 by a branch 119′ thereof. The remaining chamber 143 is located between the intermediate exhaust chamber 142 and the right hand exhaust chamber 118, and it is communicated with the pressure chambers 112 of the cylinders 108 of both actuators 17 and 18.

In the neutral position of the pilot spool seen in FIGURE 3, the land 139 is located centrally of the inlet chamber 124, and the inlet chamber along with chambers 140, 141 for both actuator cylinders are communicated with the exhaust passage 119 through the grooves 137 and 138 in the spool. Though the chamber 143 associated with the plungers 109 has been shown as closed off from all other chambers in the pilot valve at this time, it can be assumed that the plungers 109 are in their retracted positions.

It should be here noted that the pilot spool has an axial passage 145 therein one end of which communicates with a cross bore through the land 139, and the other end portion of which communicates with each of a pair of bores 146 and 147 in the right hand land of the spool. The cross bores 146 and 147 are located to flank but not to communicate with the chamber 143 in the neutral position of the pilot spool.

When the pilot spool is shifted a first distance to the left of neutral, it similarly causes the main valve spool 290 to be shifted a first distance to the left of neutral to its slow raise position. In this first position of the pilot spool, chamber 140 remains in communication with the left hand exhaust chamber 118, land 139 closes off chamber 140 from the inlet chamber, chamber 141 is closed off from the intermediate exhaust chamber 142, chamber 143 is communicated with the inlet chamber through the axial passage 145 and cross bore 147, and chamber 141 is connected with the inlet chamber through the groove 138 in the spool. As a result, the cylinder of actuator 17 is vented, pressure fluid flows into the chambers 112 of each actuator to propel the plungers 109 to their operative positions, and pressure fluid flows into the cylinder 108 of actuator 18 to cause the main valve spool to move to the left until it collides with the plunger 109 of actuator 17, at the slow lift position of the main valve spool.

If the pilot spool is moved a second distance to the left of neutral, the above connections remain the same, except that the pressure chambers 112 of both actuators 17–18 are vented to effect retraction of the plungers 109. This last results from the fact that the pilot pressure chamber 143 associated with the plungers is vented to the intermediate exhaust chamber 142 through the cross bores 146 and 147. Consequently, the main valve spool is actuated to its fast raise position past the then retracted plunger 109 of actuator 17, under the continued flow of pressure fluid into the cylinder 108 of actuator 18.

The pilot spool 135, when shifted a first distance to the right of neutral, correspondingly effects actuation of the main valve spool to the right of neutral to its slow lower position described earlier. In that case, the pilot groove 137 conducts pressure fluid to chamber 140 which connects with the cylinder of actuator 17, while the axial passage 145 and cross bore 146 conduct pressure fluid to chamber 143 which connects with the pressure chambers 112 of both actuators. Spool groove 138 vents the cylinder 108 of actuator 18. The main valve spool is thus caused to move to the right to its slow lower position defined by its engagement with the plunger of actuator 18.

If the pilot spool is shifted to its next position to the right of neutral, the last described connections to the actuators 17 and 18 remain unchanged, but the pressure chambers 112 of both actuators are vented. This is accomplished by the cross bores 146 and 147, which then communicate the chamber 143 with the right hand exhaust chamber 118.

In each of the FIGURES 3 and 4 embodiments of the invention, the main valve spool is adapted to effect lowering of a load at two different speeds, while in the FIGURE 4 embodiment, the main valve spool is also adapted to effect raising of a load at two different speeds. This can be compared to a coarse adjustment of the speed at which the motor or cylinder governed by the valve operates.

In each of the operating positions of the main valve element in the FIGURE 4 embodiment, however, fine adjustment of motor speed is obtainable over a substantial range, through the response of the combination bypass and speed controlling valve mechanism 14 to the different metering settings of its pilot valve that can be made to determine what part of the pump fluid entering the inlet port of the main valve will flow to the reservoir in bypass relation to its service passages. Thus, for example, an operator of the valve mechanism can shift the pilot valve member to its position effecting fast raising of the load on the cylinder, and then modify or reduce the speed at which the load is raised by suitable manipulation of the pilot valve element in the manner described in connection with the FIGURE 1 embodiment of the invention, to slightly reduce the back pressure tending to hold the bypass valve closed. This allows partial opening of the bypass valve and effects a reduction in the amount of pump fluid flowing to the head end of the cylinder, to correspondingly reduce the rate at which the load is elevated.

In this respect, the pilot valve member can be said to provide adjustable restricting means for an auxiliary bypass leading through the pilot valve. This auxiliary bypass can be completely closed by the pilot valve member when it is fully shifted to any selected one of its operating positions to effect closure of the bypass valve and actuation of the main valve element to a corresponding operating position. The auxiliary bypass can be partially opened by slight movement of the pilot valve member out of its selected operating position to allow a metered amount of its inlet fluid to flow past the valve member to an exhaust passage in the pilot body and the remainder of such inlet fluid to flow to one or the other of the hydraulic actuators 17, 18 at sufficient pressure to hold the main valve element in its selected position. The resulting reduction in back pressure at the inlet of the pilot valve accordingly effects partial opening of the bypass valve to reduce the speed of motor operation in correspondence with the magnitude of the pressure drop in the auxiliary bypass, or pilot inlet.

From the foregoing description, together with the accompanying drawings, it will be readily apparent to those skilled in the art that this invention provides an improved and simplified control valve mechanism comprising a main control valve and mechanism cooperable therewith to effect a wide range of adjustment of the speed at which a motor governed by the valve mechanism operates.

What is claimed as my invention is:

1. Control apparatus for governing flow of pressure fluid to and from a fluid motor, comprising:
   (A) a pilot valve having a pressure fluid inlet, a pair of control ports, exhaust outlet means, and a valve member movable from a neutral position communicating both control ports and the inlet with the exhaust outlet means, to first and second operating positions closing off the inlet from the outlet means and communicating a different one of the control ports with the inlet and the other control port with the outlet means, said valve member being movable to a number of operating positions intermediate its neutral and first operating positions to variably restrict communication between the inlet and the outlet means and accordingly vary the pressure at its inlet;
   (B) a main valve governed by the pilot valve and including a body having a bore, an inlet, a supply passage at all times directly and unrestrictedly communicating the inlet with the bore, a service passage from which source fluid entering the bore from the supply passage can flow to a fluid motor, an exhaust passage opening from the bore and having a portion opposite the supply passage and remotely spaced therefrom in the direction of the bore axis, and a valve element separate from the pilot valve member and movable in the bore to first and second operating positions to in turn communicate the service passage with the supply passage and then with the exhaust passage;
   (C) hydraulic actuating means operatively connected with the main valve element and with the pilot control ports, to effect actuation of the valve element to said first and second operating positions thereof depending upon which of the pilot control ports is communicated with the pilot inlet by the pilot valve member;
   (D) another bore in the main valve body, extending lengthwise between and connecting the supply passage with the exhaust passage;
   (E) an elongated bypass valve mechanism mounted in said other bore in spaced relation to the wall thereof to define therewith an elongated annular bypass which encircles said bypass valve mechanism and provides for flow of source fluid from the supply passage lengthwise along the exterior of said bypass valve mechanism to the exhaust passage in bypass relation to the service passage, said bypass valve mechanism having a pressure responsive valve member movable toward bypass open position in response to the pressure of source fluid in the supply passage;
   (F) and means for conducting pressure fluid from the supply passage to the pilot inlet through the bypass valve mechanism and whereby the valve member of the latter is also rendered response to the pressure of fluid at the pilot inlet to be movable toward bypass closing position in consequence of increasing pressure at the pilot inlet to an extent proportional to the displacement of the pilot valve member toward said first operating position thereof.

2. In combination with a main control valve having a valve element movable to first and second operating positions to in turn communicate a service passage with a supply passage and then with a return line:
   (A) a pilot valve having exhaust outlet means, a pressure fluid inlet connected with said supply passage to receive pressure fluid therefrom, a pair of control ports, and a valve element movable from a neutral position communicating both control ports and the inlet with the exhaust outlet means, to first and second operating positions closing off the inlet from the outlet means and communicating a different one of the control ports with the inlet and the other control port with the outlet means, said valve element being movable to a number of operating positions intermediate its neutral and first operative positions to variably restrict communication between the inlet and the outlet means and accordingly vary the back pressure at its inlet;
   (B) hydraulic actuating means operatively connected with the main valve element and with the pilot control ports, to effect actuation of the main valve element to said first and second operating positions thereof in response to and depending upon which one of the pilot control ports is communicated with the pilot inlet by the pilot valve element;
   (C) and a bypass valve mechanism connecting with said supply passage and with the return line, and having a pressure responsive valve member movable toward bypass open position in response to force which pressure fluid in the supply passage exerts upon one portion thereof to thereby provide for flow of pressure fluid from the supply passage to the return line in bypass relation to said service passage, and said valve member being movable toward bypass closing position in response to force which said back pressure at the pilot inlet exerts upon another portion of the bypass valve member and to an extent proportional to the displacement of the pilot valve element toward said first operating position thereof.

3. The combination of claim 2, wherein pressure fluid from the supply passage is conducted to the pilot inlet through passage means in the bypass valve mechanism.

4. The combination of claim 2, further characterized by:
   (A) biasing means acting on the main valve element and effective whenever the pilot valve element is in its neutral position, to yieldingly hold the main valve element in a neutral position at which it closes off communication between the supply and service passages;
   (B) and passage means in the main valve controlled by the main valve element and effective in the neutral position only of the main valve element to provide limited communication between the supply passage and the return line so that part of the pressure fluid entering the main valve in the neutral position of the pilot valve element will flow through said last named passage means to the return line while the remainder will flow to the return line through the bypass valve mechanism.

5. In combination:
   (A) a main valve having
      (1) a pressure fluid inlet,
      (2) a service passage,
      (3) an exhaust outlet for connection with a return line,
      (4) a valve element movable against return bias from a neutral position to first and second operating positions to in turn communicate the service passage with the inlet passage and then with the exhaust outlet,
      (5) a first bypass passage controlled by the main valve element and providing for limited flow of pressure fluid from the inlet passage to the return line in said neutral position only of the valve element,
      (6) and a second bypass passage affording a flow path to the return line for the balance of the pressure fluid entering the inlet passage in said neutral position of the main valve element;
(B) fluid pressure operated actuating means connected with the main valve element for shifting the same out of its neutral position to said first and second operating positions thereof;
(C) a pilot valve for controlling operation of said actuating means, and having
  (1) exhaust outlet means,
  (2) an inlet which is communicated with the pressure fluid inlet of the main valve,
  (3) a pair of control ports connected with said actuating means,
  (4) and a valve element shiftable from a neutral position communicating its inlet and both of said control ports with the exhaust outlet means, to first and second operating positions closing off the inlet from the exhaust outlet means and communicating a different one of the control ports with the inlet and the other control port with the exhaust outlet means so as to effect shifting of the main valve element to one or the other of its operating positions, depending upon which of said control ports is communicated with the pilot inlet;
(D) and a bypass valve mechanism for controlling said second bypass, said bypass valve mechanism having a pressure responsive valve member which is movable to a bypass open position in consequence of force exerted on one portion thereof by pressure of fluid at the main valve inlet, and which valve member is movable toward bypass closing position in response to force exerted on another portion thereof by pressure fluid at the pilot inlet at times when the pilot valve element is in an operating position at which it causes pressure fluid to flow to said service passage from the main valve inlet.

6. Control apparatus wherein the valve element of a main valve is movable from a spring biased neutral position to first and second operating positions to in turn communicate a service passage with a supply passage and then with an exhaust passage, and wherein such shifting of the valve element is effected by fluid pressure operated actuating means at the dictate of a pilot valve having a valve element which is movable from a neutral position to first and second operating positions corresponding to those of the main valve element to in turn direct pressurized control from an inlet in the pilot valve to one or the other of a pair of control ports that are connected with the actuating means, said control apparatus being characterized by:
  (A) the pilot inlet being communicated with the supply passage in the main valve;
  (B) the pilot inlet and both its control ports being vented by the pilot valve element in the neutral position thereof;
  (C) said supply passage having limited communication with the exhaust passage in the neutral position of the main valve element so that part of the pressure fluid entering the supply passage will then flow along a first flow path to the exhaust passage, and so that a back pressure will tend to obtain in said supply passage;
  (D) means providing a second flow path along which the remainder of the pressure fluid entering the supply passage can flow to a return line in the neutral position of the main valve element;
  (E) and a bypass valve mechanism governing said second flow path, said bypass valve mechanism having a pressure sensitive valve member which opens in response to said back pressure in the supply passage, and which valve member is adapted to close in response to back pressure at the pilot inlet in said first operating position of the pilot valve element.

7. The control apparatus of claim 6, further characterized by:
  (A) the mechanism of the main valve and of the bypass valve being housed within a common valve body;
  (B) and the bypass valve mechanism having a passageway therein through which the pilot inlet is communicated with the supply passage in the main valve.

8. Control apparatus wherein the valve element of a main valve is movable from a spring biased neutral position to first and second operating positions to in turn communicate a service passage with a supply passage and then with an exhaust passage, and wherein such shifting of the valve element is effected by fluid pressure operated actuating means at the dictate of a pilot valve having a valve element which is movable from a neutral position to first and second operating positions corresponding to those of the main valve element to in turn direct pressurized control fluid from an inlet in the pilot valve to one or the other of a pair of control ports that are connected with the actuating means, said control apparatus being characterized by:
  (A) the pilot inlet being communicated with the supply passage in the main valve;
  (B) the pilot inlet and both its control ports being vented by the pilot valve element in the neutral position thereof;
  (C) means controlled by the main valve element and operable in the neutral position thereof to provide communication between the supply passage and the exhaust passage for flow of supply fluid to the latter along a first path while at the same time assuring that a degree of back pressure will obtain in the supply passage;
  (D) means providing a second flow path along which pressure fluid entering the supply passage can flow to a return line in the neutral position of the main valve element;
  (E) and a bypass valve mechanism governing said second flow path, said bypass valve mechanism having a pressure sensitive valve member which opens in response to said back pressure in the supply passage, and which valve member is adapted to close in response to back pressure at the pilot inlet in said first operating position of the pilot valve element.

References Cited

UNITED STATES PATENTS

| | | | |
|---|---|---|---|
| 2,873,762 | 2/1959 | Tennis | 137—596.13 |
| 3,151,455 | 10/1964 | Tennis | 91—414 |
| 3,263,574 | 8/1966 | Tennis | 91—436 |

M. CARY NELSON, *Primary Examiner.*

R. J. MILLER, *Assistant Examiner.*

U.S. Cl. X.R.

137—491, 495, 625.63; 251—285